United States Patent

Ohki

[11] Patent Number: 5,963,559
[45] Date of Patent: Oct. 5, 1999

[54] RADIO TRANSMISSION WITH A SLOW TRANSMISSION MODE USED WHEN RETRANSMISSION OF A DATA FRAME FAILS EVEN REPEATED

[75] Inventor: Masahiro Ohki, Tokyo, Japan

[73] Assignee: NEC Corporation, Japan

[21] Appl. No.: 08/740,169

[22] Filed: Oct. 24, 1996

[30] Foreign Application Priority Data

Oct. 31, 1995 [JP] Japan ..................... 7-283207

[51] Int. Cl.$^6$ ........................................ H04J 3/02
[52] U.S. Cl. ............................ 370/445; 370/461
[58] Field of Search ......................... 370/445, 465, 370/464, 467, 446, 447, 448, 449, 216, 310, 314, 319, 321, 337, 341, 347, 348, 442, 431, 444, 458, 461, 462, 241, 503; 340/825.08, 827, 825.01; 379/221; 395/181

[56] References Cited

U.S. PATENT DOCUMENTS

| | | | |
|---|---|---|---|
| 5,615,212 | 3/1997 | Ruszczyk et al. | 370/455 |
| 5,757,790 | 5/1998 | Taketsugu | 370/445 |

FOREIGN PATENT DOCUMENTS

| | | |
|---|---|---|
| 1-190144 | 7/1989 | Japan . |
| 4-154238 | 5/1992 | Japan . |
| 4-304746 | 10/1992 | Japan . |
| 6-291809 | 10/1994 | Japan . |

*Primary Examiner*—Dang Ton
*Attorney, Agent, or Firm*—Ostrolenk, Faber, Gerb & Soffen, LLP

[57] ABSTRACT

For radio data (DT) transmission by media access based on a CSMA scheme in a system, such as a radio LAN, wherein a source node retransmits a DT frame if an ACK monitor IFS interval S lapses following forward transmission of the DT frame before reception of an ACK frame which a destination node backward transmits an ACK transmission IFS interval T (longer than the interval S) following due reception of the DT frame, a transmission mode is forward changed from an original mode of the forward transmission to a slow mode if retransmission fails with the original mode twice and the slow mode later used for backward transmission. Each of the source and the destination nodes is put, in the original mode, in a waiting state for afresh use as either a source or a destination node after a data transmission IFS interval D (longer than the interval T) either when the source node receives the ACK frame in the original or the slow mode or if the ACK frame is not received even the retransmission is repeated a predetermined number of times, when the DT frame is discarded with the backward transmission given up.

30 Claims, 4 Drawing Sheets

RADIO TRANSMISSION WITH A SLOW TRANSMISSION MODE USED WHEN RETRANSMISSION OF A DATA FRAME FAILS EVEN REPEATED

BACKGROUND OF THE INVENTION

This invention relates to radio transmission of data frames by media access based on a CSMA (carrier sense multiple access) scheme, wherein a source node forward transmits a data frame towards a destination node and retransmits the data frame or retries forward transmission of the data frame to the destination node when the source node does not receive from the destination node within an acknowledge monitor IFS (interframe space) interval following the forward transmission an ACK (acknowledgement) frame indicative of due receipt of the data frame at the destination node.

A radio data transmission system for a method of the above-described radio transmission is used typically in a radio LAN (local area network) which has a data transmission rate between 1 and 2 Mbps and is recently widely adopted to local radio data transmission. Such a radio LAN is susceptible to an influence of multipath formed by a number of radio channels which are dependent on local circumstances. The radio LAN consequently has an objectionable data transmission error rate and a deteriorated data transmission performance when compared with a wired LAN. A retransmission or retry facility is therefore specified for radio LAN's, in order to insure a sufficient data transmission performance, in a MAC (media access control) layer which is Layer 2 of the LAN reference model and corresponds to Layer 2 (data link layer) of the OSI (open system interconnection) reference model.

In the manner which will later be described more in detail, the data frame has been retransmitted as follows according to a draft standard of IEEE 802.11 Radio LAN Committee.

It will first be presumed that a data frame is correctly transmitted from a source node to a destination node so that retransmission of the data frame is unnecessary. In this case, the destination node deals with media access with an acknowledge transmission IFS interval following arrival thereat of the data frame to begin backward transmission of an ACK frame back to the source node. While put in a waiting state for forward transmission of an afresh data frame as a different frame either to the above-described source or destination node or to a different node on a transmission medium, a particular node confirms, by carrier sense or detection, disappearance of the data frame or the ACK frame from the transmission medium. A data transmission IFS interval following the disappearance of frames, the particular node begins media access for transmission of a carrier. The particular node subsequently performs a backoff process for prevention of conflict between the frames. Immediately following the backoff process, the particular node holds or secures the transmission medium and transmits the different frame to its destination.

It will now be surmised that the first-mentioned data frame is received at the destination node and includes an error. Having detected the error, the destination node does not transmit the ACK frame back to the source node. A non-response IFS interval following the forward transmission longer than the acknowledge transmission IFS interval, the source node carries out media access to transmit a carrier. Immediately following the backoff process at the source node to hold the transmission medium, the source node retransmits the first-mentioned data frame to the destination node. If this data frame is duly or correctly received, the destination node back transmits the ACK frame.

In this conventional retransmission, the source node may not receive the ACK frame from the destination node despite repetition of the retransmission because the transmission medium is subjected to a severe multipath condition. In such an event, the source node discards the data frame when the retransmission is tried a predetermined number of times.

In such a radio data transmission system, each frame includes a CRC (cyclic redundancy check) code for use in error check. Each destination node checks the CRC code. When a CRC error is detected in the data frame, the destination node does not produce the ACK frame. When the data frame is discarded in the MAC layer or by a MAC protocol, retransmission is assigned to a higher layer and is processed by, for example, a TCP (transmission control protocol) of the TCP/IP (transmission control protocol/internet protocol). Such a retransmission facility gives a high reliability to data transmission in the MAC layer.

In the manner described in the foregoing, three different IFS intervals are used for the carrier sense in the retransmission facility in order to give a higher priority degree at a general destination node to the backward transmission of the ACK frame. More particularly, vacancy or idleness of the transmission medium is detected at the destination node in general the acknowledge transmission IFS interval following arrival thereat of a data frame with the acknowledge transmission IFS interval predetermined shorter than the data transmission IFS interval and with the backoff process omitted. In other words, the destination node backward transmits the ACK frame, with no restriction, immediately after a lapse of the acknowledge transmission IFS interval. The non-response IFS interval is naturally longer than the acknowledge transmission IFS interval and is shorter than the data transmission IFS interval.

The backoff process is performed at the source station following the non-response IFS interval. The backoff process is performed also at each node that may be whichever of the source and the destination nodes concerned previously with a data frame and an ACK frame and of a different node called the particular node before. The transmission medium is actually accessed by one of such waiting nodes waiting for access to the transmission medium that is settled by a least random number at the lapse of the data transmission IFS interval.

In the meanwhile, an improved retransmission or retry technique is disclosed in Japanese Patent Prepublication (A) No. 154,238 of 1992. According to this patent prepublication, a plurality of work stations are connected as nodes to a LAN, which is connected in turn to a server for the work stations. Each work station comprises first means for requesting retransmission with a presumption of disappearance of a data frame upon failure of an acknowledgement frame within a predetermined retry time interval and second means for adjusting the retry time interval on a basis of an overloaded state of the server. This insures a high reliability of data transmission and reception with no deterioration of system performance even if it is impossible to neglect the retry time interval in an overloaded state, namely, when the retry time interval would further increase the overload state of the server.

Most recently, it has become indispensable for a radio LAN to deal with multimedia information which includes image data, picture information, and others besides character d ata. As a consequence, the data transmission rate must be as high as 10 Mbps or higher. This necessitates a higher symbol rate and makes it necessary to strengthen a withstandingness against the multipath. This further necessitates more frequent occurrence of the retransmission because a frame error rate rises under common multipath circumstances (a common delay time of a reflected signal for a main signal).

It is therefore summarized in connection with a conventional radio data transmission system that the system has a deteriorated throughput as a whole. This is because the retransmission is more frequently necessary in a recent radio LAN of a higher data transmission rate due to severe multipath circumstances and because the retransmission is assigned to a higher layer when the retransmission in a lower layer, such as by the MAC protocol, is frequently necessary as often as a predetermined limit of frequency.

Even by the improved retransmission technique, a deterioration is inevitable in the throughput or in an overall performance of the system because the retransmission becomes inevitably more frequent under severe circumstances of the transmission medium.

SUMMARY OF THE INVENTION

It is consequently an object of the present invention to provide a method of transmitting data frames by media access based on a CSMA scheme in a radio data transmitting system, wherein it is possible to obviate deterioration of throughput of the system even if a multipath condition is severe.

It is another object of this invention to provide a method which is of the type described and which can keep a system throughput on a certain level or better by using an effective MAC protocol for enabling correct data transmission with a low data transmission rate even under severe multipath circumstances where the system is liable to a high data error rate and is difficult to insure the correct data transmission.

It is still another object of this invention to provide a method which is of the type described and in which it is possible to do with no surplus overhead on transmitting frames.

It is a different object of this invention to provide a local node used as a source node in a radio data transmission system mentioned in the method of the type described.

It is another different object of this invention to provide a local node used as a destination node in a radio data transmission system described before.

Other objects of this invention will become clear as the description proceeds.

In accordance with an aspect of this invention, there is provided a method of transmitting frames by media access based on a carrier sense multiple access scheme in a radio data transmitting system comprising a plurality of nodes as at least first, second, and third nodes, comprising the steps of (a) forward transmitting a data frame from the first node to the second node, (b) backward transmitting an acknowledgement frame from the second node to the first node when the second node duly receives the data frame, and (c) retransmitting the data frame from the first node to the second node when the first node does not receive the acknowledgement frame within an acknowledge monitor interframe space interval following an instant of the step of forward transmission, wherein the second node backward transmits the acknowledgement frame with a higher priority degree than transmission of another data frame from the third node and wherein the method further comprises at the first node the steps of (d) forward changing a transmission mode of transmission of the data frame to a slow mode when no acknowledgement frame is received from the second node during progress of the step of retransmission and (e) backward changing the slow mode towards an original mode of the step of forward transmission when the acknowledgement frame is received from the second node within the acknowledge monitor interframe space interval after retransmission of the data frame during the progress of the step of retransmission.

In accordance with a different aspect of this invention, there is provided a local node which is for use in a radio data transmitting system transmitting frames among a plurality of nodes comprising a different node besides the local node by media access based on a carrier sense multiple access scheme and comprises (A) transmitting and receiving means for (Aa) forward transmitting a data frame to the different node, (Ab) receiving an acknowledgement frame from the different node when the different node duly receives the data frame, (Ac) retransmitting the data frame to the different node when the acknowledgement frame is not received from the different node within an acknowledge monitor interframe space interval following forward transmission of the data frame, and (Ad) starting the media access a data transmission interframe space interval following latest transmission of the data frame with the data transmission interframe space interval determined longer than the acknowledge monitor interframe space interval and (B) mode transition means for (Ba) forward changing a transmission mode of transmission of the data frame to a slow mode when the acknowledgement frame is not received from the different node during progress of retransmission of the data frame to the different node and for (Bb) backward changing the slow mode towards an original mode of the forward transmission when the acknowledgement frame is received from the different node during the progress of the retransmission.

In accordance with another different aspect of this invention, there is provided a local node which is for use in a radio data transmitting system transmitting frames by media access based on a carrier sense multiple access scheme among a plurality of nodes comprising besides the local node a different mode in turn comprising transmitting and receiving means for (a) forward transmitting a data frame to the local node and (b) retransmitting the data frame to the local node when the different node does not receive an acknowledgement frame from the local node within an acknowledge monitor interframe space interval following forward transmission of the data frame at the different node and source mode transition means for (d) forward changing a transmission mode of transmission of the data frame to a slow mode when the acknowledgement frame is not received from the local node during progress of retransmission of the data frame to the local node and (e) backward changing the slow mode to an original mode of the forward transmission when the acknowledgement frame is received from the local mode during the progress of the retransmission and comprises (A) receiving and transmitting means for (Aa) receiving the data frame to produce the acknowledgement frame upon due reception of the data frame and (Ab) backward transmitting the acknowledgement frame to the different node in response either to forward transmission or to retransmission of the data frame from the different node an acknowledge transmission interframe space interval following either the forward transmission or the retransmission with the acknowledge transmission interframe space interval determined shorter than the acknowledge monitor interframe space interval and (B) destination mode transition means for (Ba) forward changing a transmission mode of backward transmission of the acknowledgement frame to a slow mode when no data frame is duly received from the different node by the retransmission and (Bb) backward changing the slow mode towards the original mode when the data frame is duly received from the different node.

DESCRIPTION OF THE PREFERRED EMBODIMENT

Figure 1:
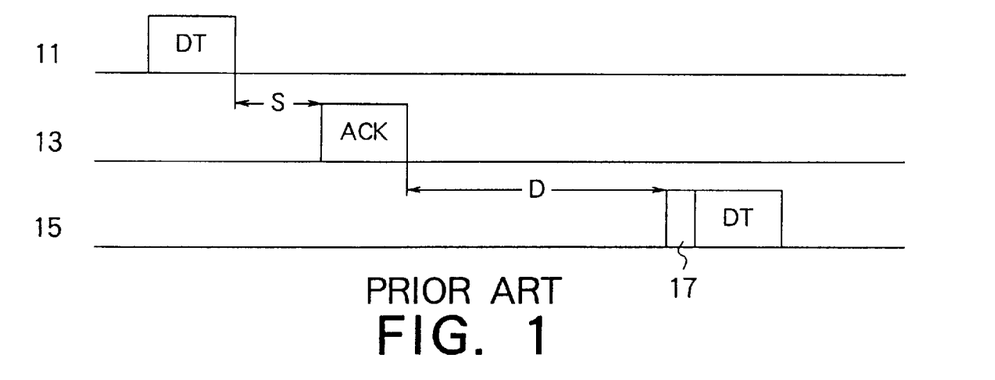
FIGS. 1 through 3 schematically exemplify progress of a conventional manner of radio transmission of a data frame with allowance of retransmission of the data frame.
Figure 2:
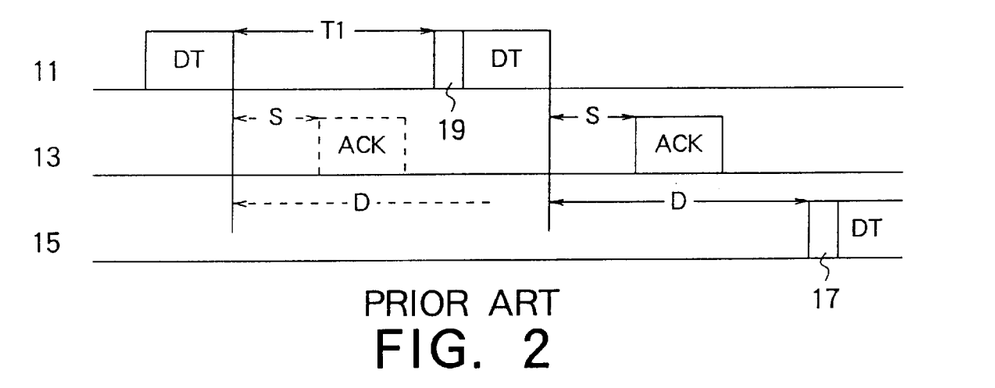
Figure 3:
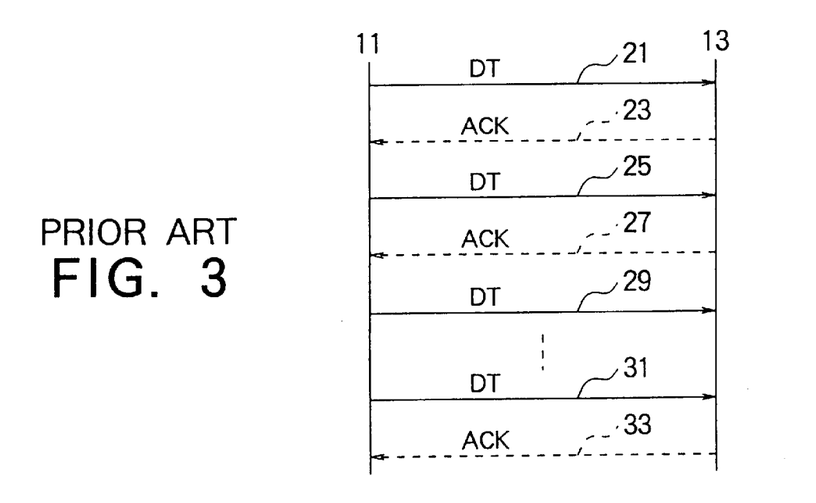

Referring to FIGS. 1 through 3, a conventional method of transmitting frames in a radio data transmitting system will first be described in order to facilitate an understanding of the present invention. The conventional method is based on a draft which is referred to hereinabove and is known as the draft of IEEE 802.11 of Radio LAN (local area network) Committee. FIGS. 1 and 2 are time charts illustrating the method when the radio data transmitting system conveys and does not convey a DT (data) frame duly with no error, respectively. FIG. 3 is a sequence chart exemplifying the method.

In the manner depicted in FIGS. 1 through 3, the radio data transmitting system comprises a plurality of nodes coupled to a transmission medium visually depicted by a horizontal line and is typically a radio LAN. Each node is operable by media access based on a CSMA (carrier sense multiple access) scheme as a source and a destination node. The node comprises first, second, and third nodes 11, 13, and 15 which are in FIGS. 1 through 3, a source node, a destination node, and a different node which is in a waiting state while the method is during progress in the first and the second nodes 11 and 13.

In FIG. 1, the first node 11 forward transmits a DT frame at a certain instant of time to the second node 13. Before this forward transmission, the first node 11 confirms by carrier sense or detection wether or not the transmission medium is vacant, namely, free of frames. Immediately after successful confirmation of vacancy of the transmission medium, the first node 11 performs a backoff process to avoid conflict between carrier for the frames and then proceeds to the forward transmission.

Substantially simultaneously, the second node 13 receives the DT frame from the first node 11 as a received frame. It is presumed that the DT frame is duly received. An acknowledge transmission IFS (interframe space) interval S following arrival of the DT frame from the first node 11 at the second node 13 as the received frame with the received frame checked at the second node 13 for any error in the meantime, the second node 13 produces an ACK (acknowledgement) frame and meanwhile carries out carrier sense to backward transmit the ACK frame to the first node 11 without performing the backoff process. Convey of the DT frame comes to an end. Each frame includes a CRC (cyclic redundancy check) code and preferably address codes as a source and a destination address which specify the first and the second nodes 11 and 13 in the example being illustrated.

It is additionally presumed that the third node 15 is waiting for transmission of a fresh DT frame as a different source node to one of the nodes of the radio data transmission system that may be whichever of the first and the second nodes 11 and 13 and a further different node (not shown) and serves as a fresh destination node. During this waiting state, the third node 15 deals with the carrier sense. When the ACK frame of the second node 13 reaches the first node 11, the transmission medium becomes vacant. A data transmission IFS interval D following disappearance of the DT and the ACK frames from the transmission medium, the third node 15 performs the backoff process which is now indicated at 17. Immediately after the backoff process 17, the third node 15 transmits the fresh DT frame to the transmission medium.

In FIG. 2, it is surmised that a DT frame is transmitted from the first node 11 to the second node 13 and is not duly received at the second node 13. The second node 13 does not backward transmit the ACK frame, which is therefore indicated by a dashed-line block. The first node 11 becomes aware of this fact by non-receipt of the ACK frame from the second node 13 within a non-response IFS interval T1 following forward transmission of the first-mentioned DT frame to the second node 13. The non-response IFS interval is longer than the acknowledge transmission IFS interval S. Having understood that this forward transmission failed, the first node 11 begins the carrier sense. Having confirmed that no frames are on the transmission medium, the first node 11 begins the backoff process at 19 after the non-response IFS interval T1 following the forward transmission. Immediately subsequently, the first node 11 retransmits or retries the forward transmission of the first-mentioned DT frame to the second node 13. It is assumed that this retry is successful.

Throughout the operation described in conjunction with FIGS. 1 and 2, the third node 15 remains in the waiting state. The data transmission IFS interval D is indicated here and there. The operation so far described is processed according to a MAC (media access control) protocol in a MAC layer or sublayer of the LAN reference model mentioned heretobefore.

In FIG. 3, only the first and the second nodes 11 and 13 are illustrated by vertical solid lines. In the manner indicated by a horizontal solid line 21, the first node 11 forward transmits a DT frame to the second node 13. When the DT frame is not duly received, the second node 13 backward transmits no ACK frame as indicated by a horizontal dashed line 23. Receiving no ACK frame within the acknowledge monitor IFS interval S from the second node 13, the first node retransmits the DT frame to the second node 13 for a first time as indicated by another solid line 25. When the first node 11 receives no ACK frame from the second node 13 as indicated by another dashed line 27, the first node 11 retransmits the DT frame for a second time to the second node 13 as depicted by still another solid line 29. In this manner, the first node 11 repeats retransmission of the DT frame to the second node an N-th time as indicated by yet another solid line 31. It is assumed in this case that no ACK frame is received at the first node 11 from the second node 13 as indicated by yet another dashed line 33 even by repetition of the retransmission N times if the radio data transmission system is in a severe multipath condition.

It will now be supposed that N represents a predetermined limit for repetition of the retransmission. Under the circumstances, the first node 11 discards the DT frame, namely, gives up forward transmission of the DT frame to the second node 13 in the MAC layer. The first node 11 hands the forward transmission over to a higher layer to transmit the DT frame as, for example, in accordance with the TCP (transmisison control protocol) described heretobefore.

Figure 4:
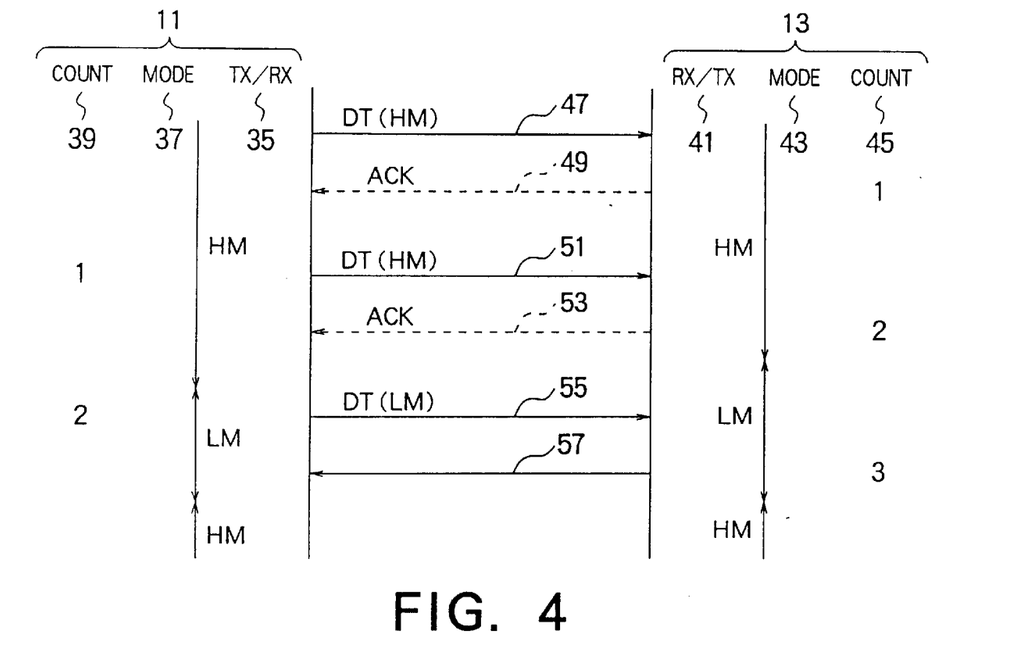
FIG. 4 is a sequence chart of a method according to a preferred embodiment of the instant invention.
Figure 5:
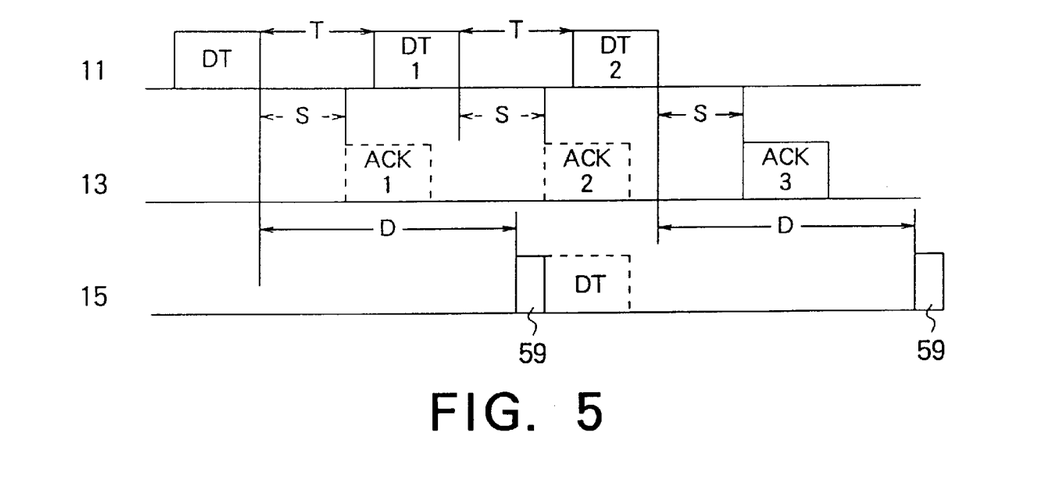
FIG. 5 is a time chart corresponding to the sequence chart of FIG. 4.

Referring now to FIGS. 4 and 5, the description will proceed to a novel method according to a preferred embodiment of this invention. The novel method is an improvement in the conventional method illustrated with reference to FIGS. 1 through 3 and is likewise applicable to the radio data transmission system which comprises the first and the second nodes 11 and 13 indicated on a left and a right side in FIG. 4 and along a first or top row and a second row in FIG. 5. Additionally, the radio data transmission system comprises like in FIG. 2 the third node 15 indicated along a third or bottom row in FIG. 5. The first and the second nodes 11 and 13 are operable as the source and the destination nodes in the method being illustrated. The third node 15 is in the waiting state. Each of the nodes, such as 11 and 13, will alternatively be called a local node and is operable as a source and a destination node in a certain and another short time interval, respectively.

In the manner depicted in FIG. 4 on the left side, the first node 11 comprises a transmitting and receiving device (TX/RX) 35 and a source mode transition device (MODE) 37 which is novel. As will later be described, the first node 11 further comprises a source counting device (COUNT) which will be designated by a reference numeral 39. On the right side of FIG. 4, the second node 13 comprises a receiving and transmitting device (RX/TX) 41 and a destination mode transition device (MODE) 43 which is novel. Furthermore, the second node 13 comprises a destination counting device (COUNT) which will later be described and will be denoted by a reference numeral 45. The source and the destination mode transition devices 37 and 43 are for setting a transmission mode of transmitting the DT and the ACK frames usually at an original mode which is faster than a slow or low-speed mode LM and is therefore alternatively called a high-speed mode and is indicated by a combined reference symbol HM.

In the manner depicted in FIG. 4, the transmitting and receiving device 35 forward transmits a DT frame to the second node 13 in the original mode HM at a certain time instant as indicated by a horizontal solid line 47. In FIG. 5, this forward transmitted DT frame is depicted at a leftmost part along the first row. If the DT frame were duly received by the receiving and transmitting device 41 as a received frame with no error, the receiving and transmitting device 41 would backward transmit without the backoff process an ACK frame for a first time to the first node 11 the acknowledge transmission IFS interval S following forward transmission of the DT frame or, more particularly, following an end of the received frame, which end is substantially simultaneous with an end of the DT frame forward transmitted.

It is surmised for the time being that the received frame is found erroneous. The receiving and transmitting device 41 does not produce the ACK frame as depicted in FIG. 5 by a dashed-line block at a leftmost part with a suffix 1 along the second row for backward transmission to the first node 11 as indicated in FIG. 4 by a dashed line 49. An acknowledge transmission IFS interval T following the end of the DT frame forward transmitted, the transmitting and receiving device 35 retransmits without the backoff process the DT frame to the second node 13 for a first time in the normal mode HM, or retries the forward transmission for the first time, as indicated in FIG. 4 by another solid line 51. This DT frame is depicted in FIG. 5 with a suffix 1 at a middle part along the first row.

The receiving and transmitting device 41 does not backward transmits the ACK frame to the first node 11 as indicated in FIG. 4 by another dashed line 53 and in FIG. 5 by another dashed-line block at a middle part with another suffix 2 along the second row. The acknowledge monitor IFS interval S following an end of the DT frame retransmitted for the first time, the source mode transition device 37 forward changes or switches the transmission mode to the slow mode LM. The transmitting and receiving device 35 retransmits the DT frame for a second time to the second node 13 in the slow mode LM as depicted in FIG. 4 by still another solid line 55 and in FIG. 5 at a rightmost part with another suffix 2 along the first row.

It will now be presumed that the receiving and transmitting device 41 correctly receives as the received frame the DT frame second retransmitted from the first node 11. Although not depicted as a block, this received frame has an end indicated by a vertical thin line a little rightward of the ACK frame depicted in FIG. 5 at the middle part along the second row. The acknowledge transmission IFS interval S after this end, the receiving and transmitting device 41 produces the ACK frame and actually backward transmits with no backoff process this ACK frame to the first node 11 for a third time as indicated in FIG. 4 by a leftward directed solid line 57 and in FIG. 5 by a solid-line block at a right-most part with still another suffix 3 along the second row.

As soon as the transmitting and receiving device 35 confirms reception of the ACK frame backward transmitted from the second node 13, the source mode transition device 37 backwardly changes the slow mode LM to the original mode HM. As soon as the ACK frame is actually backward transmitted, the destination mode transition device 45 backwardly changes the slow mode LM to the original mode HM. The transmitting and receiving device 35 is ready for forward transmission to a destination node a different DT frame which may carry identical informations common to the first-mentioned DT frame.

In FIG. 4 and consequently in FIG. 5, the destination mode transition device 43 usually sets the original mode HM for backward transmission of an ACK frame to a source node having forward transmitted to the second node 13 a DT frame in response to which this ACK frame should be produced by the receiving and transmitting device 41. Meanwhile the transmission mode is set at the original mode, the receiving and transmitting device 41 backward transmits the ACK frame to the source node. If the DT frame is not duly received even though forward transmitted and then retransmitted for the first time, the receiving and transmitting device 41 may make the destination mode transition device 43 forward change the original mode HM to the slow mode LM. In this event, the receiving and transmitting device 41 receives twice retransmitted DT frame in the slow mode LM and backward transmits, in response to due receipt of the twice retransmitted DT frame, to the source node in the slow mode LM an ACK frame which corresponds to the ACK frame depicted in FIG. 5 in the rightmost part with the suffix 3 along the second row.

In FIG. 5, it is assumed that the third node 15 is going to transmit to a destination node a fresh DT frame, which may carry the information of the first-mentioned DT frame. The data transmission IFS interval D following the end of the DT frame forward transmitted by the first node 11, the third node 15 performs the backoff process indicated at 59 having finished the carrier sense. In the manner indicated by the DT frames at the middle and the rightmost parts along the first row, either a frame or at least the carrier for the DT frames is present on the transmission medium. In order to avoid conflict with the DT frame retransmitted from the first node 11 to the second node 13, the fresh DT frame is not actually launched to the transmission medium and is therefore depicted by a dashed-line block along the third row. The data transmission IFS interval D after the end of the retransmitted DT frame duly received at the second node 13, the third node 15 again tries the backoff process as indicated again by the reference numeral 59. If waiting for forward transmission to a destination node which may now be one of the first and the second nodes 11 and 13, a DT frame is transmitted following success of this backoff process.

Reviewing FIGS. 4 and 5, the acknowledge transmission IFS interval S is shortest of the three different IFS intervals S, T, and D. Furthermore, the destination node backward transmits the ACK frame to the source node without the backoff process. The destination node therefore acquires a media access right with a highest priority degree among transmission of other frames by the destination and other nodes. Retransmission of the DT frame in the original HM or the slow mode LM is given a next degree of priority with no backoff process. Consequently, forward transmission and retransmission of the DT frame by the source node and backward transmission of the ACK frame by the destination node have a higher priority degree than transmission of fresh frames by other nodes, such as the third node 15.

In addition, the media access right is acquired consecutively repeated by the source or the destination node. It is therefore possible to count a count of repetition of DT frame transmission and another count of backward transmission of the ACK frame independently in the source and the destination nodes. This additionally enables separate control of the transmission mode at the source and the destination nodes. As a consequence, it is unnecessary to specifically establish, as by handshaking, synchronism of control of the transmission mode between the source and the destination nodes. This obviates necessity of surplus overhead on delivering the frames to the transmission medium.

Figure 6:
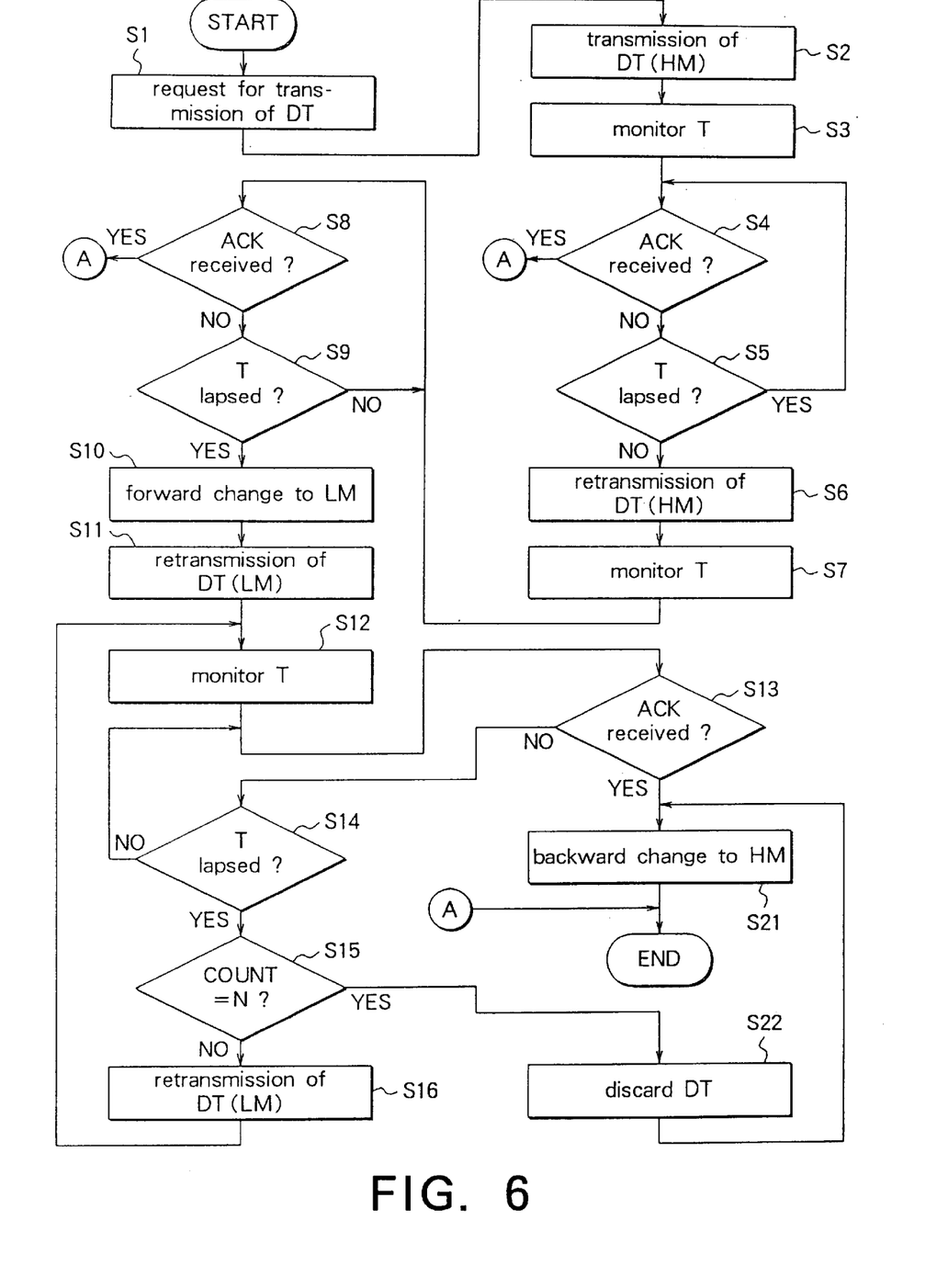
FIG. 6 is a flow chart of operation which proceeds in a source node for use in implementing the method mentioned in connection with FIG. 4.

Turning to FIG. 6 with FIG. 4 again referred to, operation of the first node 11 will be described in connection with a flow chart. It should be noted throughout the following that steps will not be mentioned which have no direct connection with this invention, such as carrier sense, backoff, and error check. The first node 11 is used as a source node with the second node 13 selected as a destination node.

While kept at START in a waiting state for forward transmission of a DT frame to a destination node, the source mode transition device 37 sets operation of the transmitting and receiving device 35 in the normal mode HM. A request for forward transmission of a DT frame occurs at a first primary step S1. The transmitting and receiving device 35 forward transmits the DT frame at a second primary step S2 to the second node 13 and monitors at a third primary step S3 reception of an ACK frame from the second node 13 within the acknowledge monitor IFS interval T. If the transmitting and receiving device 35 receives the ACK frame at a fourth primary step S4 from the second node 13 before the acknowledge monitor IFS interval T lapses at a fifth primary step S5, the operation comes to an END with the first node 11 put back to the waiting state.

If the ACK frame is not received at the fourth primary step S4 from the second node 13 and furthermore if the acknowledge monitor IFS interval T lapses at the fifth primary step S5, the transmitting and receiving device 35 retransmits the DT frame in the original mode HM at a sixth primary step S6 to the second node 13 for a first time and again monitors the acknowledge monitor IFS interval T at a seventh primary step S7. If the transmitting and receiving device 35 receives the ACK frame at an eighth primary step S8 from the second node 13 before the acknowledge monitor IFS interval T lapses at a ninth primary step S9, the operation comes to the END with the first node 11 put back to the waiting state.

If the ACK frame is not received at the eighth primary step S8 from the second node 13 in response to retransmission for the first time and furthermore if the acknowledge monitor IFS interval T lapses at the ninth primary step S9, the mode transition device 37 forward changes the original mode HM to the slow mode LM at a tenth primary step S10. The transmitting and receiving device 35 retransmits the DT frame at an eleventh primary step S11 to the second node 13 for a second time in the slow mode LM and once again monitors the acknowledge monitor IFS interval T at a twelfth primary step S12.

If the transmitting and receiving device 35 receives the ACK frame at a thirteenth primary step S13 from the second node 13 before lapse of the acknowledge monitor IFS interval T at a fourteenth primary step S14, the source mode transition device 37 backward changes at a first secondary step S21 the slow mode LM to the original mode HM. Meanwhile, the source counting device 39 counts a count of repetition of retransmission, with the retransmission for the first time counted as one and with one added to the count when the DT frame is retransmitted for the second time in the manner which will later be exemplified. Subsequently, the operation comes to the END. The first node 11 is put back to the waiting state with the source counting device 39 cleared.

If the ACK frame is not received at the thirteenth primary step S13 from the second node 13 and furthermore if the acknowledge monitor IFS interval T lapses at the fourteenth primary step S14, the source counting device 39 is checked at a fifteenth primary step S15 whether or not the count reaches a predetermined ultimate number N. If the count is not yet equal to the predetermined ultimate number N at the fifteenth primary step S15, the transmitting and receiving device 35 retransmits the DT frame in the slow mode LM at a sixteenth primary step S16, which returns to the twelfth primary step S12 with one successively added to the count.

If the predetermined ultimate number N is reached at the fifteenth primary step S15, the transmitting and receiving device 35 discards the DT frame at a second secondary step S22. The second secondary step S22 jumps back to the first secondary step S21.

Figure 7:
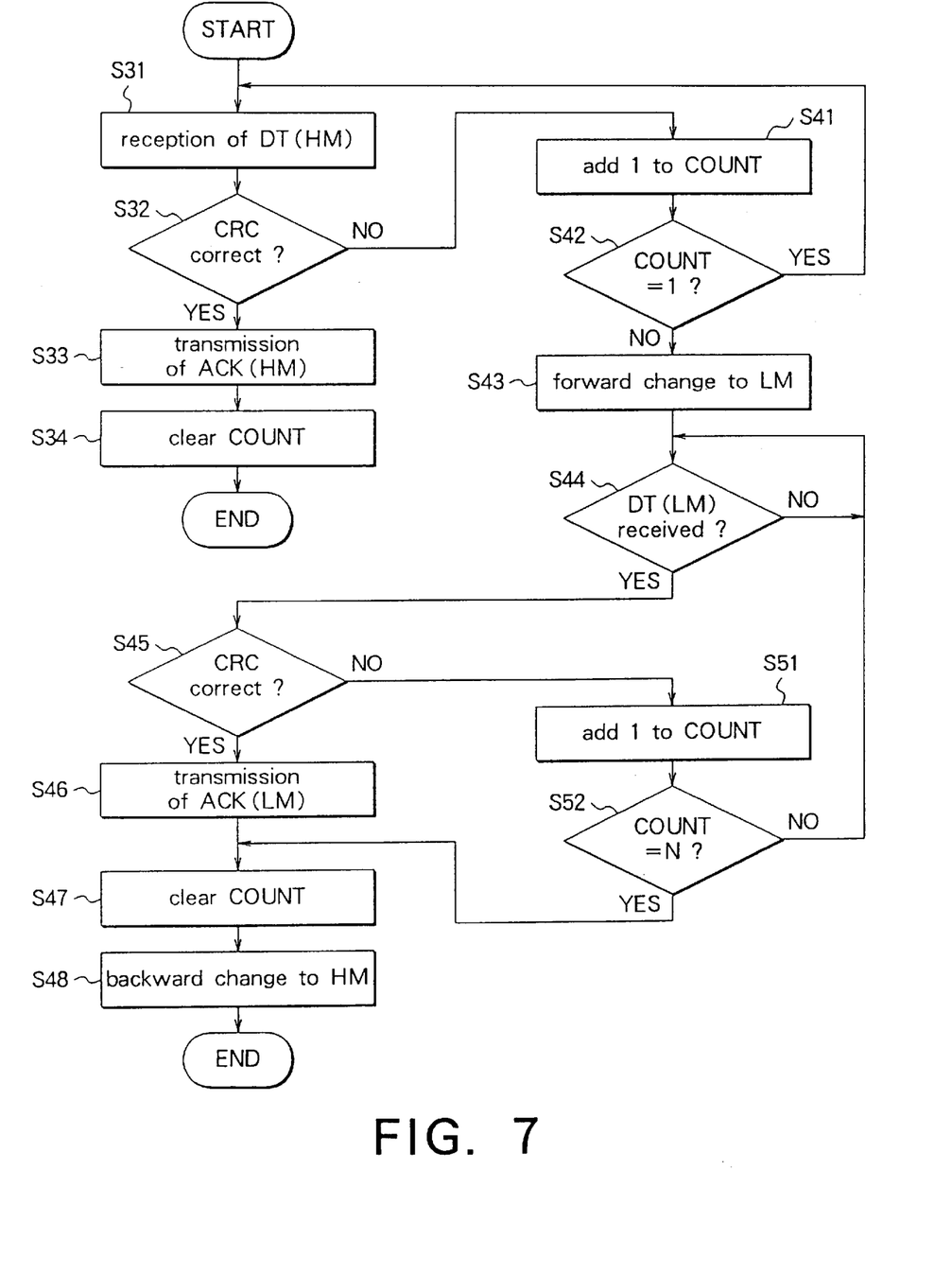
FIG. 7 is a flow chart of operation which proceeds in a destination node for implementing the method mentioned in connection with FIG. 4.

Further turning to FIG. 7 with FIG. 4 continuously referred to, operation of the second node 13 will be described with description omitted like in FIG. 6 as regards the steps which have no direct connection with this invention. In FIG. 7, the steps will be numbered as tertiary through quinary steps following those in FIG. 6. The second node 13 is selected as a destination node with the first node 11 used as a source node.

While kept at START in a waiting state for receiving a DT frame from the first node 11, the destination mode transition device 43 sets operation of the receiving and transmitting device 41 in the normal mode HM. When supplied at a first tertiary step S31 with a DT frame forward transmitted from the first node 11 as a received frame, the receiving and transmitting device 41 checks at a second tertiary step S32 whether or not the CRC (cyclic redundancy check) code is correct in the received frame. If the CRC code is correct, the receiving and transmitting device 41 produces an ACK frame and backward transmits at a third tertiary step S33 the ACK frame to the first node 11 for a first time. At the same time, the receiving and transmitting device 41 clears at a fourth tertiary step S34 the destination counting device 45 to a count of zero. Operation of the second node 13 comes to an END of reception of the DT frame from the source node.

If the CRC code is not correct at the second tertiary step S32, the receiving and transmitting device 41 judges that no DT frame is received and adds one to the count of the destination counting device 45 at a first quaternary step S41. At a second quaternary step S42, the receiving and transmitting device 41 checks whether or not the count is equal to one. If the count is equal to one, this count shows that the receiving and transmitting device 41 has received a DT frame forward transmitted from the first node 11 with an error. The receiving and transmitting device 41 returns in this event to the first tertiary step 31 to receive the DT frame which will be retransmitted from the first node 11 for the first time. In this manner, the destination counting device 45 counts up the count at reception of the DT frames which are initially forward transmitted with an error and subsequently retransmitted for the first time irrespective of presence or absence of an error in the DT frame retransmitted for the first time. If no error is found in the first retransmitted DT frame again at the second tertially step S32, the receiving and transmitting device 41 backward transmits the ACK frame at the third tertiary step S33 for a second time, clears the count at the fourth tertiary step S34, and comes to the END.

If the count is not equal to one, namely, two or greater at the second quaternary step S42, the receiving and transmitting device 41 makes at a third quaternary step S43 forward change the original mode HM to the slow mode LM. As a third received frame, the receiving and transmitting device 41 receives in the slow mode LM at a fourth quaternary step S44 the DT frame retransmitted from the first node 11 for the second time and checks at a fifth quaternary step S45 whether or not the third received frame is correct.

If the third received frame was correct, the receiving and transmitting device 41 would backward transmit for a third time an ACK frame to the first node 11 at the sixth quaternary step S46, clears the count at a seventh quaternary step S47, makes the destination mode transition device 43 backward change the transmission mode to the original mode HM at an eighth quaternary step S48, and comes to an END of reception of the DT frame or frames retransmitted with repetition from the first node 11.

If the third received frame is not correct at the fifth quaternary step S45, the receiving and transmitting device 41 adds one to the count at a first quinary step S51 and checks at a second quinary step S52 whether or not the count is equal to the predetermined ultimate number N. If the count is not yet equal to the predetermined ultimate number N, the second quinary step S52 returns to the fourth quaternary step S44 to repeat reception of the DT frame repeatedly retransmitted. The steps proceed to the fifth quaternary step S45, to the sixth quaternary step S46, to the first quinary step S51, and then to the second quinary step S52.

If the count is equal to the predetermined ultimate number N, the second quinary step S52 jumps to the seventh quaternary step S47 to eventually come to the END of reception of the DT frame repeatedly retransmitted. It is now understood that the second node 13 gives up reception of the DT frame before the DT frame is repeatedly retransmitted unsuccessfully from the first node 11 the predetermined ultimate number of times. The second node 13 is now ready either for fresh forward transmission of a DT frame afresh as a source node or fresh reception of a DT frame as the destination node from a source node which may again be the first node 11 or another node of the radio data transmission system other than the first and the second nodes 11 and 13.

In FIG. 7, the CRC code is checked at the second tertiary and the fifth quaternary steps S32 and S45 immediately after reception of the received frame. The acknowledge transmission IFS interval S can therefore be sufficiently shorter than the acknowledge monitor IFS interval T and far more shorter than the data transmission IFS interval D. This makes it possible for the second node 13 to hold or seize the transmission medium with a highest priority right.

Reviewing FIGS. 6 and 7 with FIGS. 4 and 5 taken into consideration, it is possible to forward change the original mode HM to the slow mode LM as soon as the source node does not receive the ACK frame backward transmitted from the destination node within the acknowledge monitor IFS interval S after the DT frame is forward transmitted rather than retransmitted. In this event, the destination node should forward change the original mode HM to the slow mode LM as soon as an error is found in the DT frame initially forward transmitted. Under the circumstances, the source and the destination counting devices 39 and 45 are dispensed with.

Alternatively, it is possible to predetermine a plurality of lower transmission modes such as first through M-th lower transmission modes with the M-th lower transmission mode used as the slow mode LM, where M represents a predetermined integer. In this event, the source counting device 45 may count the count as m successively from zero for the DT frame initially forward transmitted and up to the predetermined ultimate number N with one added to the count whenever the DT frame is retransmitted, where m is variable between zero and N, both inclusive, and may be variable from zero up to N according to a predetermined rule rather than one by one. Even under the circumstances, it is unnecessary to establish synchronism between the source and the destination counting devices 39 and 45.

When the DT frame is retransmitted the predetermined ultimate number N of times with the receiving and transmitting device 41 made to give up operation of receiving a DT frame, processing of the DT frame under consideration is handed from the MAC protocol to the protocol in a higher layer in the manner described before. When a plurality of slower transmission modes are used with the original mode HM referred to as a zeroth slower mode, it is possible upon reception of the ACK frame within the acknowledge monitor IFS interval T to backward change an m(p)-th slower mode into an m(q)-th slower mode in consideration of the multipath condition, for example, a data error rate in the received frame, where m(q) represents one of one through M at which the ACK frame is received within the acknowledge monitor IFS interval S during repetition of retransmission of the DT frame, m(p) representing another of one through M that is less than m(q). Depending on the circumstances, the m(p)-th and the m(q)-th slower modes will be called first and second ones of the slower modes.

While this invention has thus far been described with specific reference to FIGS. 4 through 7, it will now be readily possible for one skilled in the art to carry this invention into effect in various other manners. For example, it is possible to divide, combine, or add functions of each node and, in the manner understood from several modifications of the preferred embodiment of this invention, the steps illustrated with reference to FIGS. 6 and 7.

What is claimed is:

1. A method of transmitting frames by media access based on a carrier sense multiple access scheme in a radio data transmitting system comprising a plurality of nodes comprising at least first, second, and third nodes, the method comprising the steps of forward transmitting a data frame from said first node to said second node, backward transmitting an acknowledgement frame from said second node to said first node when said second node duly receives said data frame, and retransmitting said data frame from said first node to said second node when said first node does not receive said acknowledgement frame within an acknowledge monitor interframe space interval following an instant of the step of forward transmitting, wherein said second node backward transmits said acknowledgement frame with a higher priority degree than transmission of another data frame from said third node, said method further comprising at said first node the steps of forward changing a transmission mode of transmission of said data frame to a slow mode when no acknowledgement frame is received from said second node during progress of said step of retransmission and backward changing said slow mode towards an original mode of said step of forward transmitting when said acknowledgement frame is received from said second node within the acknowledge monitor interframe space interval after retransmission of said data frame during the progress of said step of retransmission.

2. A method as claimed in claim 1, wherein said retransmitting step is only once tried with said data frame discarded if said first node receives no acknowledgement frame from said second node in response within said acknowledge monitor interframe space interval.

3. A method as claimed in claim 1, further comprising at said first node the step of counting a count of repetition of said retransmitting step.

4. A method as claimed in claim 3, wherein said counting step counts said count up to a predetermined ultimate number with said data frame discarded if said first node receives no acknowledgement frame from said second node meanwhile.

5. A method as claimed in claim 4, wherein said forward changing step changes said transmission mode towards said slow mode successively in consideration of said count through a plurality of slower modes which are monotonously varied to be not faster than said original mode and to end at said slow mode.

6. A method as claimed in claim 5, wherein said forward changing step changes said transmission mode successively stepwise to said slower modes whenever said count increases by one.

7. A method as claimed in claim 5, wherein said backward changing step changes said transmission mode from a first one of said slower modes to a second one of said slower modes when said first node first receives said acknowledgement frame from said second node within said acknowledge monitor interframe space interval following retransmission of said data frame to said second node while said count corresponds to said first one of slower modes, said second one of slower modes being determined to be faster than said first one of slower modes in consideration of a multipath condition of said radio data transmitting system with said first node put in a waiting state for transmitting either a fresh data frame or a fresh acknowledgement frame in said second one of slower modes.

8. A method as claimed in claim 4, wherein said backward changing step changes said slow mode to said original mode with said counting step cleared if said first node receives said acknowledgement frame from said second node within said acknowledge monitor interframe space interval following retransmission of said data frame while said count is equal to said predetermined ultimate number, said first node being put in a waiting state for transmitting either a fresh data frame or a fresh acknowledgement frame in said original mode.

9. A method as claimed in claim 3, further comprising at said second node the steps of backward transmitting said acknowledgement frame to said first node an acknowledge transmission interframe space interval following one of data frames forward transmitted and retransmitted that is duly received from said first node and counting a count of backward transmission of said acknowledgement frame towards said first node.

10. A method as claimed in claim 9, further comprising at said first node the step of counting a count of repetition of retransmission of said data frame to said second node up to a predetermined ultimate number with said data frame discarded if said first node receives no acknowledgement frame in response within said acknowledge monitor interframe space interval and at said second node the step of ceasing reception of the data frame from said first node when the count in said second node reaches said predetermined ultimate number.

11. A method as claimed in claim 10, wherein the counting step in said first node counts said count up to a predetermined ultimate number with said data frame discarded if said first node receives no acknowledge frame from said second node meanwhile, the counting step in said second node counting said count up to said predetermined ultimate number to cease reception of the data frames forward transmitted and retransmitted from said first node when the count in said second node reaches said predetermined ultimate number without duly receiving said data frames from said first node.

12. A method as claimed in claim 11, wherein said forward changing step changes said transmission mode towards said slow mode successively in consideration of the count in said first node through a plurality of slower modes which are monotonously varied to be not faster than said original mode and to end at said slow mode, the second node changing a transmission mode of said acknowledgement frame towards said slow mode successively to said slower modes when the count in said second node is counted up to be equal to the count in said first node.

13. A method as claimed in claim 12, wherein said forward changing step changes the transmission mode of said data frame successively stepwise to said slower modes whenever the count in said first node increases by one, said backward transmitting step changing the transmission mode of said acknowledgement frame successively stepwise to said slower modes whenever the count in said second node increases by one.

14. A method as claimed in claim 12, wherein said backward changing step changes the transmission mode of said data frame from a first one of said slower modes to a second one of said slower modes when said first node first receives said acknowledgement frame from said second node within said acknowledge interframe space interval following retransmission of said data frame to said second node while the count in said first node is equal to said first one of slower modes, said second one of slower modes being determined to be faster than said first one of slower modes with reference to a multipath condition of said radio data transmission system with each of said first and said second nodes put in a waiting state for transmitting either a fresh data frame or a fresh acknowledgement frame in said second one of slower modes.

15. A method as claimed in claim 11, wherein said backward changing step changes said slow mode to said original mode with the counting step in said first node cleared if said first node receives said acknowledgement frame from said second node within said acknowledge monitor interframe space interval following retransmission of said data frame, each of said first and said second nodes being put in a waiting state for transmitting either a fresh data frame or a fresh acknowledgement frame in said original mode.

16. A local node which is for use in a radio data transmitting system transmitting frames among a plurality of nodes comprising a different node besides said local node by media access based on a carrier sense multiple access scheme and comprises transmitting and receiving means for forward transmitting a data frame to said different node, receiving an acknowledgement frame from said different node when said different node duly receives said data frame, retransmitting said data frame to said different node when said acknowledgement frame is not received from said different node within an acknowledge monitor interframe space interval following forward transmission of said data frame, and starting said media access a data transmission interframe space interval following latest transmission of said data frame with said data transmission interframe space interval determined longer than said acknowledge monitor interframe space interval, and mode transition means for forward changing a transmission mode of transmission of said data frame to a slow mode when said acknowledgement frame is not received from said different node during progress of retransmission of said data frame to said different node and for backward changing said slow mode towards an original mode of said forward transmission when said acknowledgement frame is received from said different node during the progress of said retransmission.

17. A local node as claimed in claim 16, wherein said transmitting and receiving means retransmits said data frame only once with said data frame discarded if the acknowledgement frame is not received from said different node in response within said acknowledge monitor interframe space interval.

18. A local node as claimed in claim 17, further comprising counting means for counting a count of repetition of said retransmission.

19. A local node as claimed in claim 18, wherein said counting means counts said count up to a predetermined ultimate number with said data frame discarded if no acknowledge frame is received from said different node even when said count reaches said predetermined ultimate number.

20. A local node as claimed in claim 19, wherein said mode transition means forward changes said transmission mode towards said slow mode through a plurality of slower modes which are monotonously varied to be not faster than said original mode and to end at said slow mode.

21. A local node as claimed in claim 20, wherein said mode transition means forward changes said transmission mode successively stepwise through said slower modes whenever said count increases by one.

22. A local node as claimed in claim 20, wherein said mode transition means backward changes said transition mode from a first one of said slower modes to a second one of said slower modes when said acknowledgement frame is first received from said different node within said acknowledge monitor interframe space interval following retransmission of said data frame to said different node while said count corresponds to said first one of slower modes, said second one of slower modes being determined to be faster than said first one of slower modes in consideration of a multipath condition of said radio data transmitting system with said count changed to a number in correspondence to said second one of slower modes and with said local node put in a waiting state for transmitting either a fresh data frame or a fresh acknowledgement frame in said second one of slower modes.

23. A local node as claimed in claim 19, wherein said mode transition means backward changes said slow mode to said original mode with said counting means cleared if said acknowledgement frame is received from said different node within said acknowledge monitor interframe space interval following retransmission of said data frame while said source count is equal to said predetermined ultimate number, with said local node put in a waiting state for transmitting either a fresh data frame or a fresh acknowledgement frame in said original mode.

24. A local node which is for use in a radio data transmitting system transmitting by media access based on a carrier sense multiple access scheme among a plurality of nodes comprising besides said local node a different node in turn comprising transmitting and receiving means for forward transmitting a data frame to said local node and retransmitting said data frame to said local node when said different node does not receive an acknowledgement frame from said local node within an acknowledge monitor interframe space interval following forward transmission of said data frame at said different node and source mode transition means for forward changing a transmission mode of transmission of said data frame to a slow mode when said acknowledgement frame is not received from said local node during progress of retransmission of said data frame to said local node and backward changing said slow mode towards an original mode of said forward transmission when said acknowledgement frame is received from said local node during the progress of said retransmission and comprises receiving and transmitting means for receiving said data frame to produce said acknowledgement frame upon due reception of said data frame and backward transmitting said acknowledgement frame to said different node in response either to forward transmission or to retransmission of said data frame from said different node an acknowledge transmission interframe space interval following either said forward transmission or said retransmission with said acknowledge transmission interframe space interval determined shorter than said acknowledge monitor interframe space interval and destination mode transition means for forward changing a transmission mode of backward transmission of said acknowledgement frame to said slow mode when no data frame is duly received from said different node by said retransmission and backward changing said slow mode towards said original mode when said data frame is duly received from said different node.

25. A local node as claimed in claim 24, further comprising destination counting means for counting a destination count of backward transmission of said acknowledgement frame to said different node, said different node further comprising source counting means for counting a source count of repetition of said retransmission.

26. A local node as claimed in claim 25, said source counting means counting said source count up to a predetermined ultimate number with said data frame discarded if no acknowledgement frame is received from said local node even when said source count reaches said predetermined ultimate number, wherein said backward transmission is given up when said destination count reaches said predetermined ultimate number.

27. A local node as claimed in claim 26, said source mode transition means forward changing the transmission mode of said data frame towards said slow mode through a plurality of slower modes which are monotonously varied to be not faster than said original mode and to end at said slow mode, wherein said destination mode transition means forward changes the transmission mode of said backward transmission towards said slow mode through said slower modes while said source mode transition means forward changes the transmission mode of said data frame successively to said slower modes.

28. A local mode as claimed in claim 27, said source mode transition means forward changing the transmission mode of said data frame stepwise through said slower modes whenever said source count increases by one, wherein said destination mode transition means forward changes the transmission mode of said backward transmission successively stepwise through said slower modes while said source mode transition means forward changes stepwise through said slower modes.

29. A local node as claimed in claim 27, said source mode transition means backward changing the transmission mode of said data frame from a first one of said slower modes to a second one of said slower modes when said acknowledgement frame is first received from said local node within said acknowledge monitor interframe space interval following retransmission of said data frame to said local node while said source count corresponds to said first one of slower modes, said second one of slower modes being determined to be faster than said first one of slower modes in consideration of a multipath condition of said radio data transmitting system, wherein said destination mode transition means backward changes the transmission mode of said backward transmission from said first one of slower modes to said second one of slower modes when said source mode transition means backward changes the transmission mode of said data frame from said first one of slower modes to said second one of slower modes, with each of said local and said destination counts changed to a number in correspondence to said second one of slower modes and with each of said local and said different nodes being put in a waiting state for transmitting either a fresh data frame or a fresh acknowledgement frame in said second one of slower modes.

30. A local node as claimed in claim 26, said source mode transition means backward changing said slow mode to said original mode if said acknowledgement frame is received from said local mode within said acknowledge monitor interframe space interval following retransmission of said data frame to said local node while said source count is equal to said predetermined ultimate number, wherein said destination mode transition means backward changes said slow mode to said original mode when said source mode transition means backward changes said slow mode to said original mode, with each of said source and said destination counts cleared and with each of said local and said different modes put in a waiting state for transmitting either a fresh data frame or a fresh acknowledgement frame in said original mode.

\* \* \* \* \*